US008870269B2

(12) United States Patent
Serpeault (10) Patent No.: US 8,870,269 B2
(45) Date of Patent: Oct. 28, 2014

(54) ACCESS SYSTEMS FOR A PASSENGER COMPARTMENT

(71) Applicant: Nexter Systems, Roanne (FR)

(72) Inventor: Jerome Serpeault, Saint Cyr l'Ecole (FR)

(73) Assignee: Nexter Systems, Roanne (IT)

( * ) Notice: Subject to any disclaimer, the term of this patent is extended or adjusted under 35 U.S.C. 154(b) by 88 days.

(21) Appl. No.: 13/626,327

(22) Filed: Sep. 25, 2012

(65) Prior Publication Data

US 2013/0074686 A1 Mar. 28, 2013

(30) Foreign Application Priority Data

Sep. 26, 2011 (FR) ..................................... 11 02908

(51) Int. Cl.
*F41H 5/22* (2006.01)
*B60P 1/43* (2006.01)
*F41H 7/02* (2006.01)
*A61G 3/06* (2006.01)

(52) U.S. Cl.
CPC ................ *F41H 5/226* (2013.01); *B60P 1/435* (2013.01); *F41H 7/02* (2013.01); *A61G 3/061* (2013.01)
USPC ..................... 296/187.07; 296/61; 296/146.4; 296/146.8

(58) Field of Classification Search
CPC .............. B60J 5/102; B60J 5/103; B60J 5/10; B60J 5/101; B60J 5/106; B60J 5/108; F41H 5/223
USPC ......... 296/187.07, 57.1, 61, 62, 146.4, 146.8; 414/537; 49/371; 280/166
See application file for complete search history.

(56) References Cited

U.S. PATENT DOCUMENTS

| 3,606,382 | A | * | 9/1971 | Pollock | 296/62 |
| 4,235,047 | A | * | 11/1980 | Turner | 296/56 |
| 4,953,492 | A | * | 9/1990 | Duffty | 114/282 |
| 5,579,711 | A | * | 12/1996 | Thomas | 114/285 |
| 7,484,749 | B1 | * | 2/2009 | Doyle et al. | 280/460.1 |
| 8,091,943 | B1 | * | 1/2012 | Weber | 296/62 |
| 2010/0123330 | A1 | * | 5/2010 | Watts et al. | 296/61 |
| 2012/0062009 | A1 | * | 3/2012 | Frey et al. | 297/353 |

FOREIGN PATENT DOCUMENTS

CN 101881583 A 11/2010
EP 0 825 411 A2 2/1998

(Continued)

OTHER PUBLICATIONS

May 30, 2012 French Search Report issued in French Patent Application No. 1102908 (with Translation).

*Primary Examiner* — Jason S Morrow
(74) *Attorney, Agent, or Firm* — Oliff PLC (57) ABSTRACT

A system to access a passenger compartment, said system having a door hinged to a chassis frame by a first horizontal articulated joint and forming an inclined ramp, wherein said system comprises an actuator to move said door, linked to said door and said chassis frame, a step plate at least partially covering the outside of said door and hinged to said chassis frame by a second articulated joint parallel to said first articulated joint and with a hinge pin offset to the first articulated joint, said step plate linked to said door by a drive element connected to said door by a third articulated joint and to said step plate by a fourth articulated joint, the pins of said first through fourth articulated joints being parallel to one another and form the four summits of a parallelogram deformable between open and closed positions of said door.

13 Claims, 10 Drawing Sheets

(56) References Cited

FOREIGN PATENT DOCUMENTS

| | | |
|---|---|---|
| EP | 0 976 376 A2 | 2/2000 |
| EP | 1 650 077 A1 | 4/2006 |
| EP | 1 837 234 A1 | 9/2007 |
| GB | 2 268 133 A | 1/1994 |
| WO | WO 03/010041 A2 | 2/2003 |
| WO | WO 2008/081201 A1 | 7/2008 |
| WO | WO-2012175885 A1 * | 12/2012 |

* cited by examiner

ACCESS SYSTEMS FOR A PASSENGER COMPARTMENT

BACKGROUND OF THE INVENTION

1. Field of the Invention

The technical scope of the present invention is that of access systems for a passenger compartment and namely of a vehicle with a raised floor.

2. Description of the Related Art

Different devices have been proposed to facilitate access to a passenger compartment, for example, the passenger compartment of a vehicle.

Patent EP-0976376 relates to a device to access an ambulance in which a step plate is housed in a ramp. Two arrangements are provided that propose an access via the ramp when the step plate is in the storage position or via the step plate when the ramp is in the storage position. The ramp comprises a pivoting rampway and is deployed by means of an articulated joint enabling it to be folded in two to facilitate its storage.

Patent GB-2268133 discloses different vehicle access ramps adapted for wheelchairs. Each of these ramps also comprises a pivoting rampway deployed by means of an articulated joint enabling it to be folded in two to facilitate its storage.

Patent application WO-2008/081201 discloses a three-part ramp affording access to a vehicle. Once again, a pivoting rampway is deployed by means of an articulated joint enabling it to be folded in two to facilitate its storage, the rampway being arranged vertically in its storage position. When the ramp is folded, its third portion is arranged horizontally inside the vehicle to form the floor. This third portion is inclined in the prolongation of the rampway deployed outwards, thanks to an inclined plane arranged in the floor. Furthermore, in its storage position the rampway forms a vertical partition at the rear of the vehicle and allows a rear door of the vehicle to be closed behind it.

Patent application EP-1650077 discloses a vehicle access ramp comprising a pivoting rampway able to be deployed manually and resting on legs provided to this end. Once again, the rampway is deployed by means of an articulated joint enabling it to be folded in two to facilitate its storage. Once folded, the rampway is associated with a rear door pressing against a lateral edge of the rampway to close the vehicle's rear doorway.

Thus, it would appear, generally speaking, that access systems designed to accommodate a raised floor, namely for vehicle access, are deployed manually and are not intended for unplanned and emergency access. Moreover, existing systems generally require substantial modifications of the vehicle body, thus making them unsuitable for certain types of vehicles such as armored vehicles.

SUMMARY OF THE INVENTION

The aim of the present invention is to overcome one or several of these drawbacks to prior art by proposing an access system able to be deployed more efficiently in emergency situations. The invention may namely be suited to armored vehicles of raised height.

The invention thus relates to a system to access a passenger compartment by a doorway made in a chassis frame of the passenger compartment, the access system being constituted by at least one door hinged with respect to the chassis frame by a first horizontal articulated joint and forming an inclined ramp in its open position, system wherein it comprises at least one actuator to move the door, linked to the door and chassis frame, a step plate at least partially covering the outside of the door and hinged with respect to the chassis frame by a second articulated joint parallel to the first one and with a hinge pin that is offset with respect to the first one, the step plate being linked to the door by at least one drive element that is connected to the door by a third articulated joint and to the step plate by a fourth articulated joint, the axes of the first, second, third and fourth articulated joints being parallel to one another and arranged so as to form the four summits of a parallelogram deformable between an open position and a closed position of the door.

According to another particularity of the invention, the first articulated joint is linked to a lower edge of the door and a lower edge of the doorway, the second articulated joint being below the first one and arranged horizontally towards the exterior of the passenger compartment with respect to the first one. The lower edge of the door corresponds here to the door in its closed position.

According to another particularity of the invention, the step plate is of a size that is greater than that of the door so as to overlap it heightwise when the door is in the closed position. This length is a result of the final height that is required between the step plate and the ground when the ramp is in the open position.

According to another particularity of the invention, the passenger compartment is equipped with first external armor plates fixed to the chassis frame by first shock-absorbing elements, the door comprising a panel linked to the said first articulated joint and equipped with second external armor plates fixed to the panel by second shock-absorbing elements, the step plate comprising a panel linked to the second articulated joint and equipped with third external armor plates fixed to the panel by third shock-absorbing elements. The shock-absorbing elements are, for example, in the form of rigid spacers or compressible spacers, for example, blocks of metallic foam.

According to another particularity of the invention, the third external armor plates overlap the second external armor plates which in turn overlap the first external armor plates.

According to another particularity of the invention, the first external armor plates leave at least a first unprotected zone on the chassis frame delimiting a housing for said door actuator, said first zone being protected by the second external armor plates.

According to another particularity of the invention, the second external armor plates leave a second unprotected zone of the door panel, said second zone delimiting at least one housing for the drive means of the step plate and a housing for the panel, this second zone being protected by the third external armor plates.

According to another particularity of the invention, the door is able to move between its closed position and its open position with a maximal angular clearance of between 90° and 135°.

According to another particularity of the invention, the access system comprises at least one limit stop organ to block further movement of the door when in its maximal open position.

The present invention also relates to a vehicle comprising a passenger compartment equipped with an access system according to the invention.

A first advantage of the invention lies in the fact that this system is particularly well adapted to raised-floor vehicles operating in emergency situations.

Another advantage lies in that the system is well adapted to armored vehicles.

Another advantage of the invention lies in the fact that the system can be controlled automatically namely by piloting the hydraulic cylinders controlling the opening and closing of the access system.

Another advantage of the invention is that, when the ramp is closed, the step plate is hidden by the over-protection, thereby protecting it from aggressions such as branches, stone-throwing. The fact of the step plate being hidden is also favorable in terms of reducing the visual and radar signature of the vehicle.

BRIEF DESCRIPTION OF THE DRAWINGS

Other characteristics, advantages and particulars of the invention will become more apparent from the additional description given hereafter of the embodiments given by way of example in relation with the drawings, in which.

DETAILED DESCRIPTION OF PREFERRED EMBODIMENTS

Figure 1:
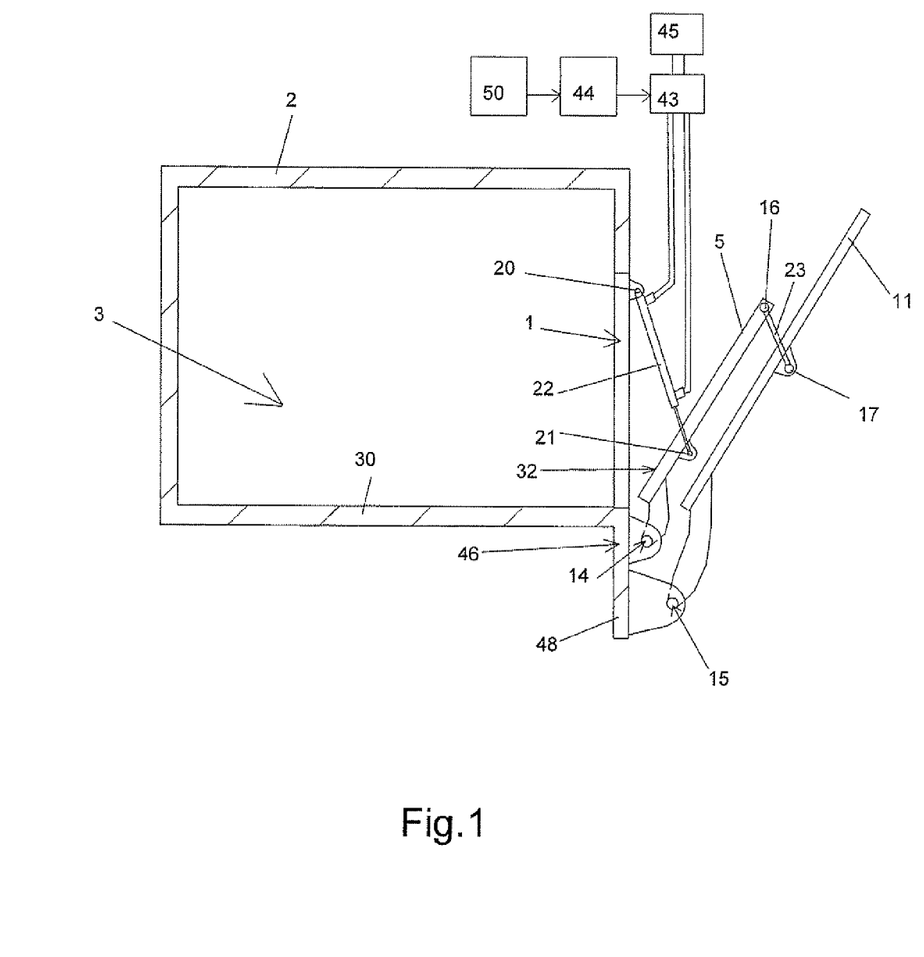
FIG. 1 is a drawing of one side of an access device in an intermediary position between its open and closed positions.

The invention will now be described in greater detail. FIG. 1 shows a section view of a passenger compartment 3 delimited by a wall forming a chassis frame 2. This passenger compartment 3 can be that of a vehicle or any other type of passenger compartment. Access to the inside of the compartment is provided by a doorway 1 made in the wall 2 forming the chassis frame and blocked by an access system incorporating a door 4.

The access system is shown in FIG. 1 in an intermediary position between a closed position and an open position. The door is made to move towards its closed or open positions by means of two actuators 22, arranged on either side of the door 4, and controlled by an automatic control device described hereafter. For practical reasons, only one actuator 22 is shown in this Figure. It goes without saying that the opening and closing of the door may be performed manually without the aid of actuators. In an emergency, opening may be performed simply by gravity. Given the ramp's mass, manual closure will be possible by providing means enabling the loads to be scaled down (winch, for example).

For the sake of the clarity of the drawings, a hydraulic control device will be shown only in FIG. 1.

The hydraulic actuator 22 is shown in the form of a double-acting cylinder whose rod input and output strokes or its blocking in position are automatically controlled according to the position of a fluid distributor 43 linked to the chambers of the cylinder. The position of the distributor 43 position is controlled by a control organ 44. This control organ 44 may itself be slaved to a central processing unit 50 that automatically manages different controls. A hydraulic unit 45 supplying a predetermined hydraulic pressure supplies the distributor 43 and the cylinder 22.

Figure 2:
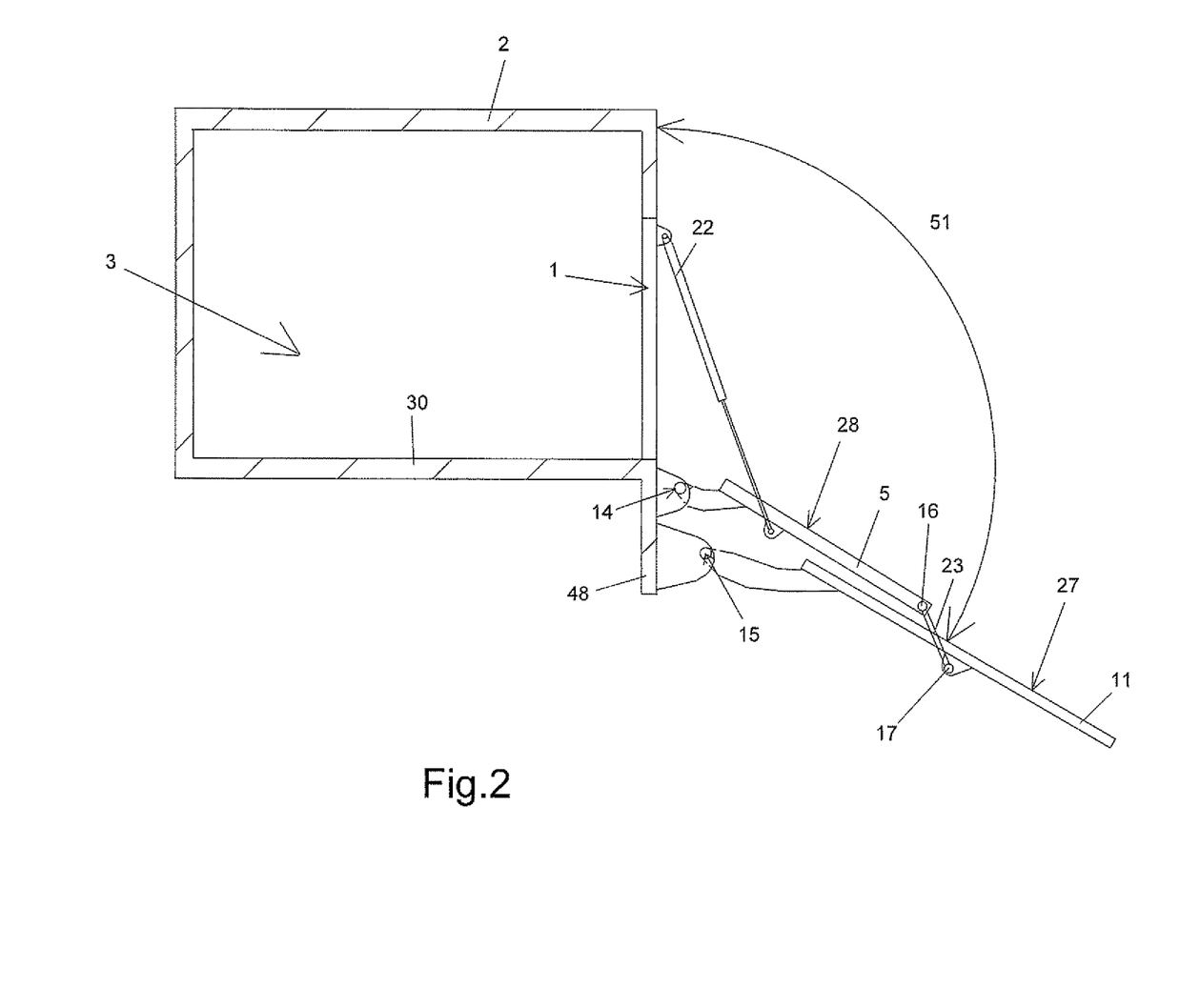
FIG. 2 is a drawing of one side of the access device in FIG. 1 in its open position.
Figure 3:
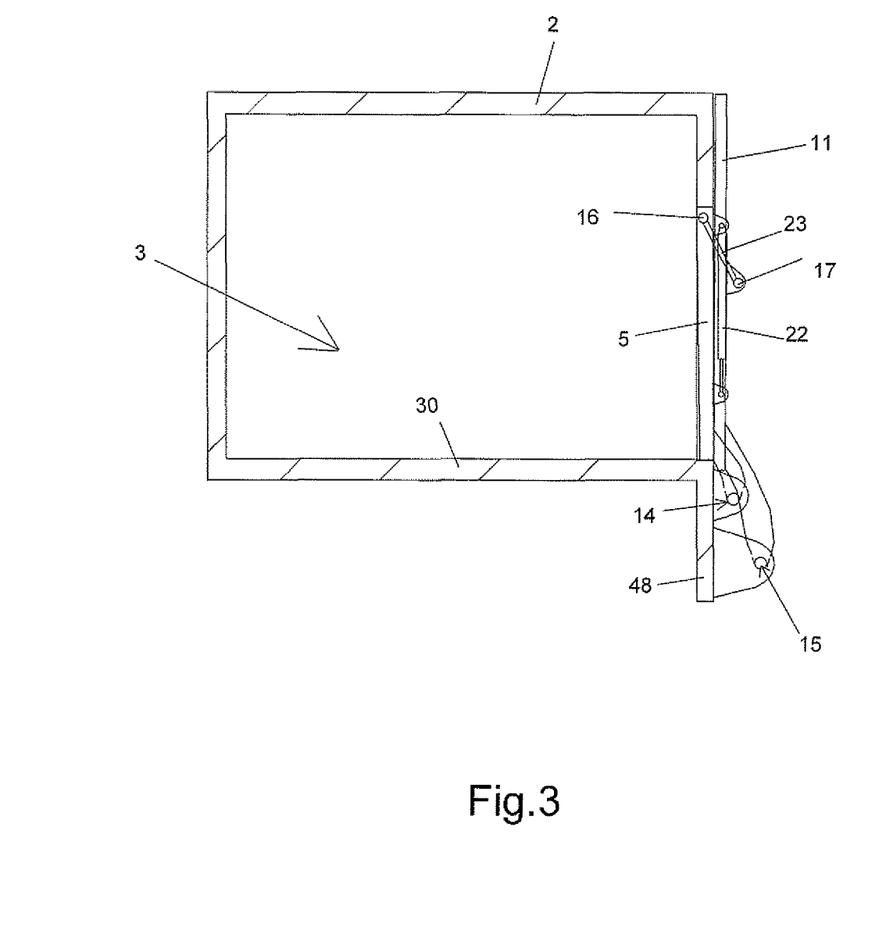
FIG. 3 is a drawing of one side of the access device in FIG. 1 in its closed position.

As schematized in FIGS. 1 to 3, the access system comprises a door 4 whose panel 5 is hinged with respect to the chassis frame 2 by a first articulated joint 14. A door 4 equipped with its armor plates will be described later with reference to FIG. 6.

The door 4 is, for example, made to move by the two actuators 22 arranged on either side of the door. Each actuator 22, of the controlled cylinder type, is linked to the panel 5 of the door and to the chassis frame 2 by two articulated joints 20 and 21. The articulated joint 14 of the door with the frame is arranged against a portion 48 of the frame positioned under the doorway 1. This articulated joint 14 may thus be fixed by cleats under the floor 30, as will be described hereafter. The actuators 22 are linked to the exterior of the wall 2 surrounding the doorway and to an external face of the door panel 5. The double-acting cylinder(s) may also be linked to the inside of the wall 2 and to an internal face of the door panel.

The door 4 is coupled with a step plate 10 comprising a panel 11 hinged with respect to the chassis frame 2 by a second articulated joint 15. A step plate 10 equipped with its armor plates will be described later with reference to FIG. 7.

The movement of the step plate will be automatically controlled when the door 4 is being opened. This movement is ensured by a drive element 23 linking the door to the step plate.

This drive element 23 for the step plate via the door is, for example, a connecting rod linked by a third articulated joint 16 to the panel 5 of the door and by a fourth articulated joint 17 to the panel 11 of the step plate.

The first articulated joint 14 arranged between the panel 5 of the door and the chassis frame 2 is linked to a lower edge 32 of the door 4 and to a lower edge 46 of the chassis frame 2 below the doorway 1. The lower edge 46 of the doorway may be made, but without limitation, by the floor 30 or by a portion prolonging it downwards or, generally speaking, by a portion 48 of the frame arranged below the doorway 1. The pivoting door mounted in the bottom of the doorway is shown in a fully open position in FIG. 2. In the closed position such as that shown in FIG. 3, the door is arranged vertically. The downwardly inclined or vertical positions of the door are naturally defined with reference to a horizontal floor 30 integral with the chassis frame 2.

The second articulated joint 15 between the panel 11 of the step plate and the frame 2 is arranged in parallel to the first articulated joint 14, the second articulated joint 15 being arranged with its rotational hinge pin offset with respect to the first one. This second articulated joint 15 is fixed to a portion 48 of the frame arranged below the doorway 1. This second articulated joint 15 may also be fixed by cleats fastened under the floor 30, as with be described hereafter. The first and second articulated joints are arranged horizontally so that the door 4 constitutes an access ramp in the open position.

The access system according to the invention advantageously enables the vehicle floor 30 to be kept plane and horizontal despite its being raised.

As schematized in FIGS. 1 to 3, the second articulated joint 15 between the frame 2 and the panel 11 of the step plate is arranged at a height lower than that of the first articulated joint 14 and horizontally offset towards the exterior of the passenger compartment 3 with respect to the first articulated joint 14. To enable the step plate 10 to be driven by the door 4, by means of the connecting rod 23, the axes of the first, second, third and fourth articulated joints, referenced 14, 15, 16 and 17, are parallel to one another and are arranged as the four summits of a parallelogram deformable between an open position and a closed position of the door.

In the open position shown in FIG. 2, the access system has a step plate surface 27 which can be stepped on and which forms a first step extended by a surface 28 of the panel 5 of the door 4 forming a second step plate to access the passenger compartment 3. The door 4 is, for example, able to move between its closed position shown in FIG. 3 and a maximal open position shown in FIG. 2, according to a maximal angular clearance, referenced 51, of between 90° and 135°.

Figure 4:
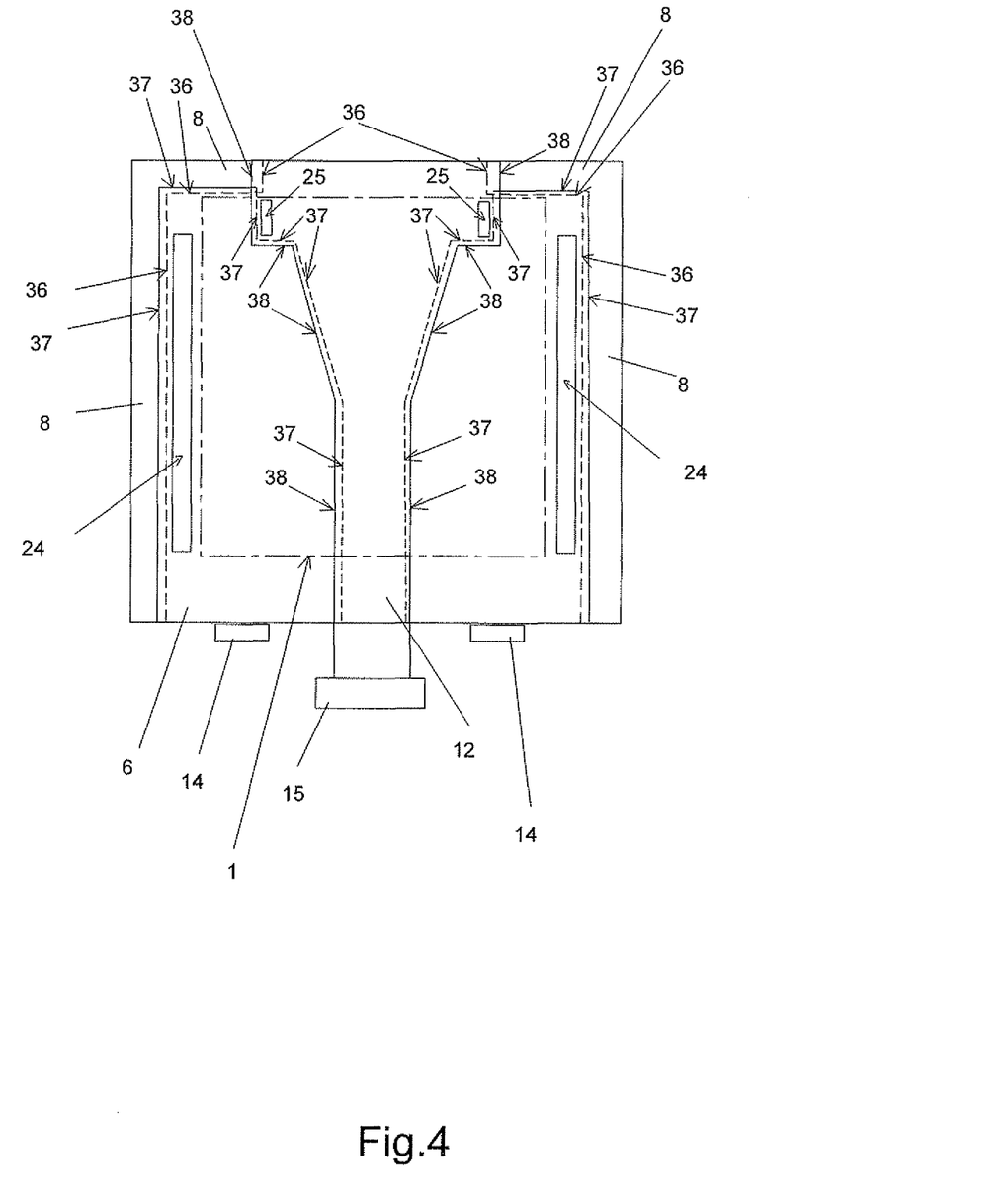
FIG. 4 shows a front view of a closed access device.

As schematized in FIG. 3 and in FIG. 4, the step plate panel 11 is made of a dimension greater than that of the door so as to overlap the door panel 5 heightwise when this is in the closed position. During opening, the free edge of the step plate panel 11 is further distanced from the free edge of the door panel 5. The free edge is used here to designate the edge facing the one linked to the articulated joint of the panel or panel.

The access system is shown in FIGS. 1 to 3 without any exterior armor plates. One example of the positioning of the exterior armor plates on the chassis frame, the door and the step plate is shown in FIG. 4. The access system is shown from the front, in the closed position. The door and step plate of the access system, as well as the passenger compartment, are equipped with exterior armor plates. The exterior armor plating is supported by shock-absorbing elements, such as rigid spacers or metallic foam.

More specifically, the wall delimiting the compartment is protected in part by first exterior armor plates 8 which namely appear on the lateral sides of the compartment as shown in FIG. 4. These first exterior armor plates 8 are overlapped by second exterior armor plates 6 fixed to the door panel and to the join between third exterior armor plates 12 fastened to the step plate panel. Reference 36 designates the edges of the exterior armor plates 8 fastened to the chassis frame. Reference 37 designates the edges of the exterior armor plates fastened to the door panel. Reference 38 designates the edges of the exterior armor plates fastened to the step plate panel.

Thus, as shown in FIG. 4, the third exterior armor plates 12 overlap the second exterior armor plates 6 which in turn overlap the first exterior armor plates 8. The third exterior armor plates 12 also overlap the first exterior armor plates 8.

The first exterior armor plates 8 leave an unprotected zone 56 of the chassis frame 2 on either side of the doorway 1. This zone 56, which appears in FIG. 5, delimits housings for actuators 22 and is arranged opposite the second exterior armor plates 6 fastened to the door. The position of the doorway 1 substantially corresponds to that of the door panel in the closed position. The actuators may thus be protected by the door 4 whilst being arranged outside the passenger compartment.

The exterior armor plates 6 fastened to the door leave an unprotected zone 57 of the panel of the door 4. This zone 57, which appears in FIG. 6, comprises a space enabling the positioning of the step plate and delimiting housings 25 for the drive elements 23 of the step plate 10 by the door 4. This zone 57 of the panel, unprotected by the exterior armor plates 6 of the door, is protected by the third exterior armor plates 12 of the step plate which lie opposite this zone.

When the access system is in the closed position, the step plate is positioned slightly back from the armor plates of the door so that the third exterior armor plates 12 of the step plate are flat against the second exterior armor plates 6 of the door. Similarly, the closed door is arranged so that the second exterior armor plates 6 of the door are flat against the first exterior armor plates 8 of the chassis frame.

Part of the chassis frame, above the doorway 1, is thus provided with no protection from the first exterior armor plates 8 but which is protected by the third exterior armor plates 12 of the step plate. This namely enables a step plate to be provided that overlaps the panel 5 of the door heightwise in the closed position of the access system. The additional height of the step plate gives additional length to the first step. The dimensions of the first step may thus be selected according to need and in particular according to the final height required between the step plate and the ground when the ramp is in the open position.

As can be seen in FIG. 4, the articulated joints 14 and respectively 15 between the chassis frame on the one hand and the door on the other and respectively the step plate 10 are shown at a level below that of the exterior armor plates but the exterior armor plates may be extended to cover and protect these articulated joints.

Without limitation, the first articulated joint 14 will be made by two hinges arranged under the lateral parts of the doorway 1. The step plate will, for example, be hinged by a single central hinge forming the second articulated joint 15. Without limitation, the panel 11 of the step plate 10 comprises a rectangular portion forming the first step 27, extended by a trapezoidal portion 59 of smaller dimensions then by an elongated rectangular portion 60 of a width corresponding substantially to the width of the central hinge forming the second articulated joint.

Figure 5:
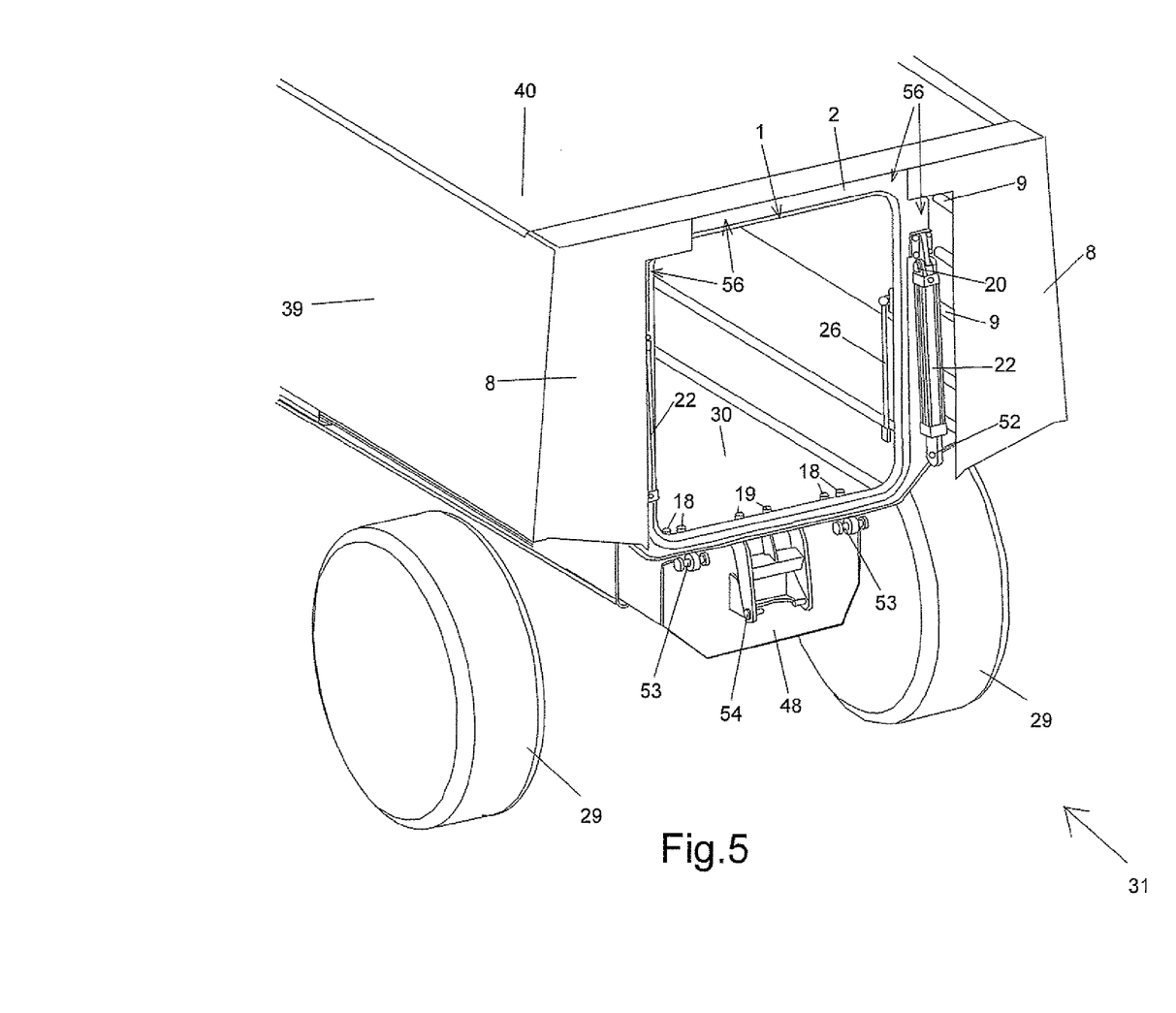
FIG. 5 shows a perspective view of a doorway made in the passenger compartment of a vehicle intended to be equipped with an access system according to the invention.
Figure 6:
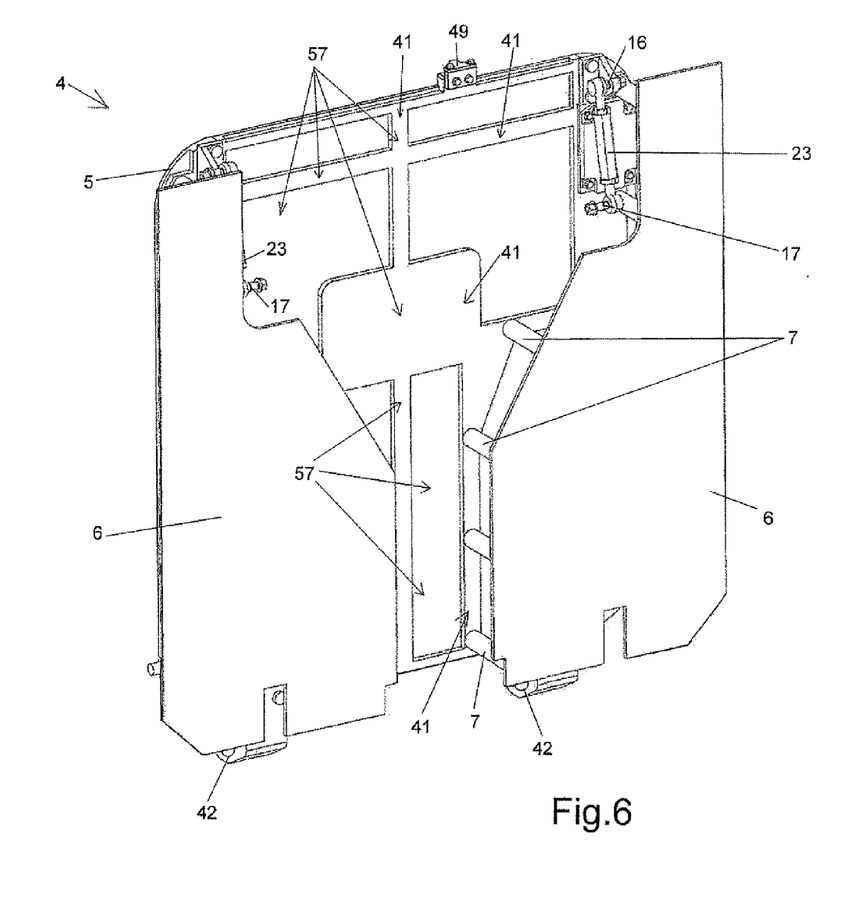
FIG. 6 shows a perspective view of a door for an access system according to the invention.
Figure 7:
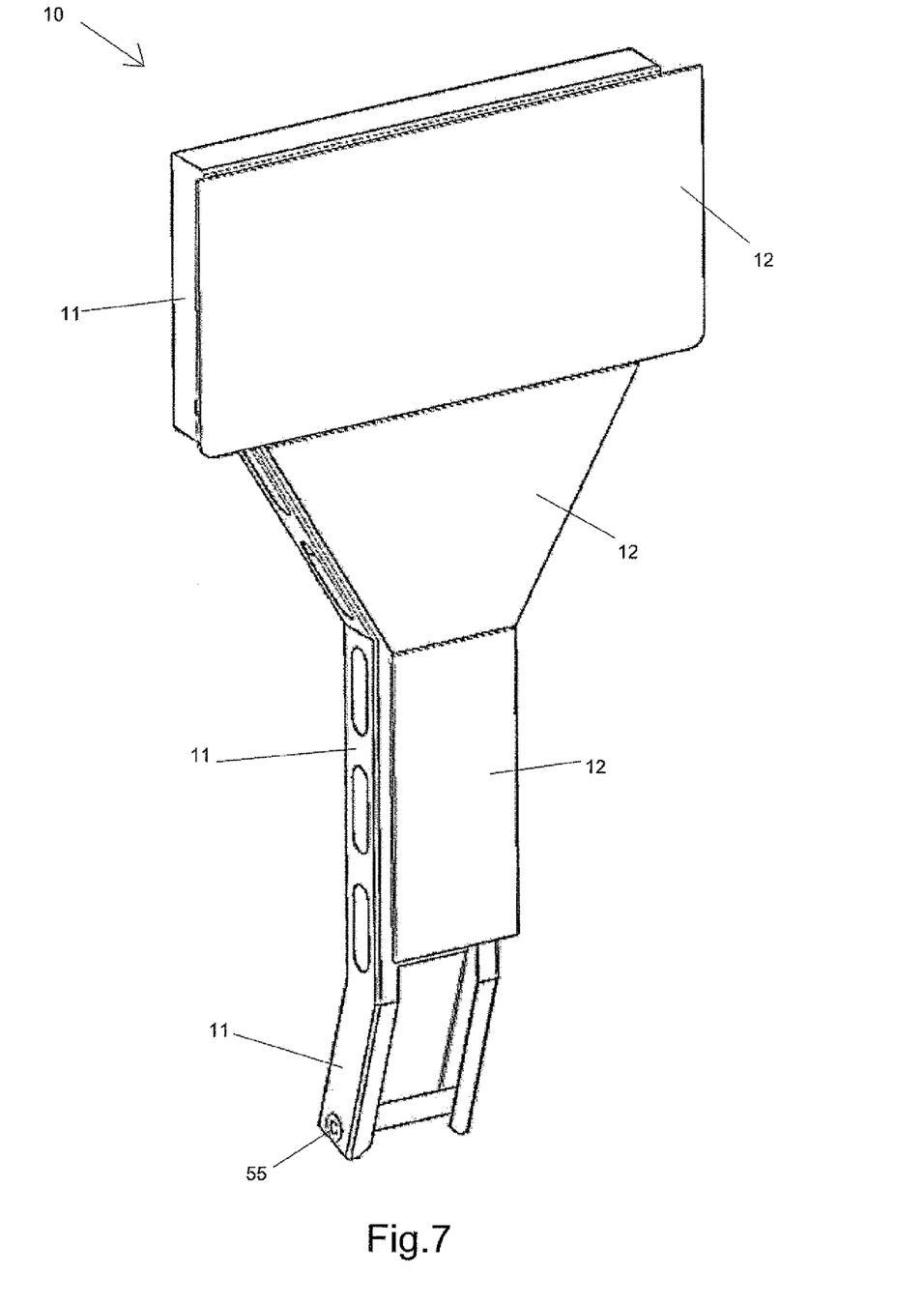
FIG. 7 shows a perspective view of a step plate for an access system according to the invention.
Figure 8:
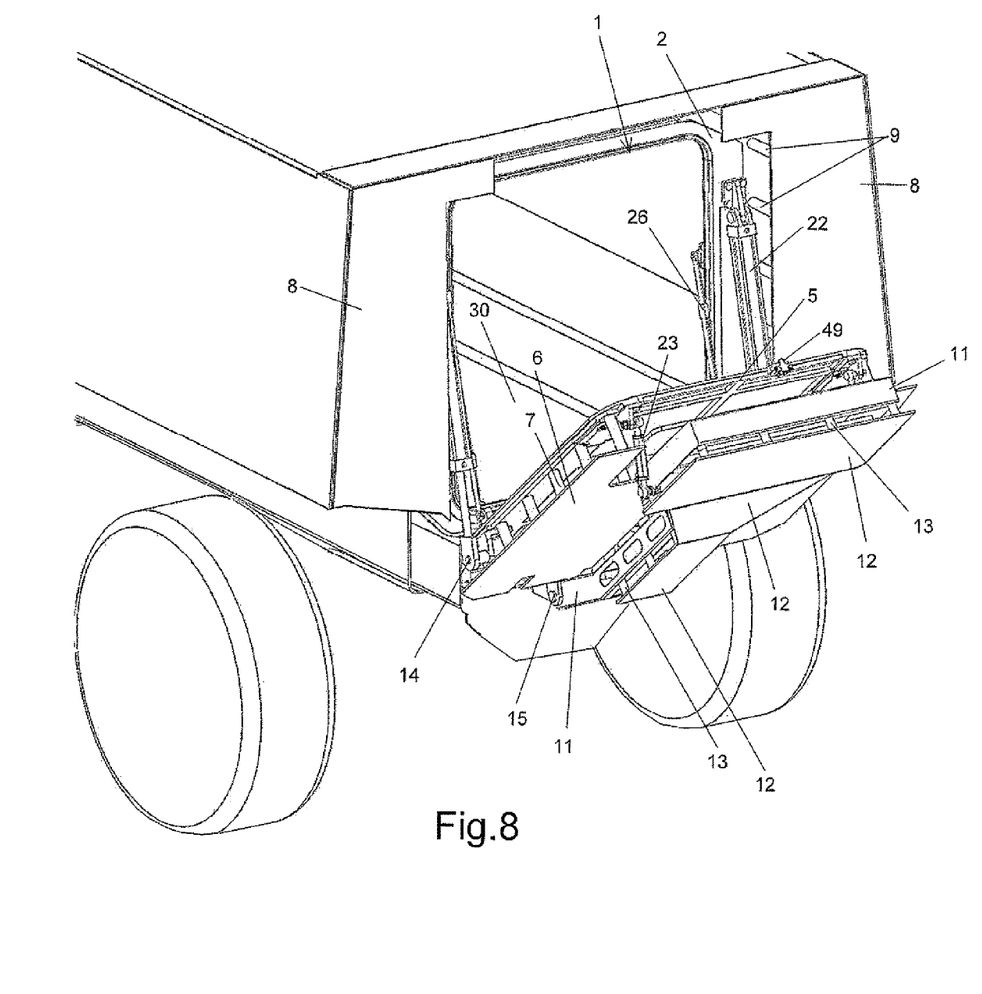
FIG. 8 shows a perspective view of an access system mounted on the rear of a vehicle in an intermediary position between its open and closed position.

FIGS. 5, 6 and 7 respectively show a doorway, a door 4 and a step plate 10 shown alone and corresponding to the access system mounted at a doorway and shown in FIG. 8.

FIG. 5 shows a doorway 1 arranged in an armored vehicle. The doorway 1 is arranged to the rear of the vehicle 31. For the sake of the clarity of the drawing, certain organs of the vehicle, such as the axles, are not shown, the wheels 29 being simply positioned. The vehicle 31 shown is a vehicle of raised height with a horizontal interior floor 30. Naturally, the floor 30 is arranged horizontally when the vehicle is on a flat surface.

Lateral armoring 39 may be provided for the vehicle 31 as well as an armored rood 40. The lateral armoring may namely be extended downwards according to the type of vehicle.

The first armor plates 8 of the frame 2 leave an unprotected zone 56 arranged above at to the sides of the doorway 1.

The actuator 22, on the right side of the plane of the Figure, of the access system appears on one side of the doorway 1, the actuator 22 arranged on the left side opposite being partially hidden by the exterior armor plates 8 fastened onto the frame of the passenger compartment. Each actuator 22 is linked, at each of its ends, to a hinge pin. A housing 52 for the articulated joint 21 with the door is shown alone, at the lower end of the actuator 22. An articulated joint 20 with the frame 2 is provided at the upper end of the actuator 22. These two articulated joints 20 and 21 have their rotational hinge pin parallel to that of articulated joints 14 and 15 of the door 4 and step plate 10.

The first exterior armor plate 8 is fastened to the shock-absorbing elements, which are in the form of spacers 9. The shock-absorbing elements are of a predetermined thickness that enables, in this thickness, housings to be made for the actuators.

An end-of-motion limit stop 26 is in the form of a caliper hinged with respect to the frame 2 and arranged facing the doorway 1. Classically in the field of mechanics, a caliper refers to an assembly of two legs articulated with respect to one another and further hinged with one leg on the frame and the other on the door.

The maximal length of the unfolded articulated caliper enables the range of motion of the door panel to be limited. In this way, the load exerted on the steps 27 and 28 in the position of maximal opening are withstood by the limit stop element 26 and not by the actuators. The actuators could also be controlled to remain blocked in their position instead of using a limit stop. Mechanical limit stops may also be provided at the articulated joint between the door and frame.

The hinge pins 53 forming the first articulated joint 14 of the door with the chassis frame are shown alone in FIG. 5. These pins 53 are each held by a fastening organ to the chassis, each of these organs being fastened under the floor by means of bolts 18. These pins 53 are intended to cooperate with the housings 42 made in the door 42.

The hinge pin 54 forming the second articulated joint 15 of the step with the chassis frame is shown alone (FIG. 5). This pin 54 is held by a fastening organ to the chassis, this organ being fastened under the floor 30 by means of bolts 19. This fastening organ comprises cleats 47 fixed by bolts 19 as well as a reinforcing part welded to the portion of the chassis 48 under the doorway 1. The hinge pin 54 is intended to cooperate with a housing 55 made in the step 10.

As shown in FIG. 6, the door panel comprises thicker reinforcement zones 41. The shock-absorbing elements 7 carrying the second exterior armor plates 6 are, for example, spacers 7 pressing against the reinforcement zones 41. The second armor plates 6 leaves an unprotected zone 57 on the door panel 5, this zone 57 being central and extending over the full height of the door. There is namely a free space in the median part of the door that is unprotected by the second armor plates 6 which substantially corresponds to the profile of the step plate 10. Without limitation, the drive elements 23 for the step plate 10 are arranged at the same height as the rectangular element of the step plate 10 forming the first step 27.

Each drive element 23 is linked to the door panel 5 of the door 4 by an articulated joint 16. The drive elements 23 for the step plate are arranged in the top part of the door 4. Two articulated joints 16 and 17 are provided at the ends of each drive element 23. The door 4 also comprises organs carrying housings 42 for the pins 53 of the first articulated joint between the door and the chassis frame. These housings are arranged in the bottom of the door 4. An organ 49 to lock the door in the closed position is arranged in the top of the door. Furthermore, the second armor plates 6 extend beyond each side of the door panel 5.

In FIG. 7, which represents the step plate 10, the third exterior armor plates 12 forms a protective screen extending beyond either side of the step panel 11. The step panel 11 comprises an elongated rectangular portion 60 inclined towards the passenger compartment of a width substantially equal to that of the cleats 47 of the second articulated joint 15 between the chassis frame and the step plate. This portion, as well as a trapezoidally-shaped part 59, is namely formed by two lateral beams of the panel 11. The trapezoidal part 59 is continued by a rectangular part which forms the first step 27 when the access system is in the open position. The housing 55 for the pin 54 of the second joint 15 is arranged in the bottom of the step plate 10.

FIG. 8 shows the access system in an intermediate position between the closed position and the position of maximal opening. The step plate 10 is distanced from the door 4 and namely the third exterior armor plates 12 of the step plate 10 is distanced from the second armor plates 6 of the door, whereas this plates was flat one against the other in the closed position of the access system.

The third shock-absorbing elements 13 linking the step panel 11 and the third exterior armor plates 12 of the step plate can be seen.

A drive element 23 can be seen between the door panel 5 and the step panel 11.

The two exterior armor plates 6 of the door, parallel to the door panel 5, are inclined at an angle of around 45° with respect to a vertical closing position of the doorway 1. The actuators 22 linked by two joints to their two ends, pivot so as to follow the movement of the door panel 5 when the actuator 22 extends or retracts.

The range-of-motion limit stop 26, linked to the interior face of the door panel 5, partly protrudes from the passenger compartment. Two range-of-motion limit stops are provided to block the door in the maximal opening position. These two limit stops 26 are here in the form of calipers. The end-of-range limit stops and the hydraulic actuators are here linked to lateral parts of the door.

Figure 9:
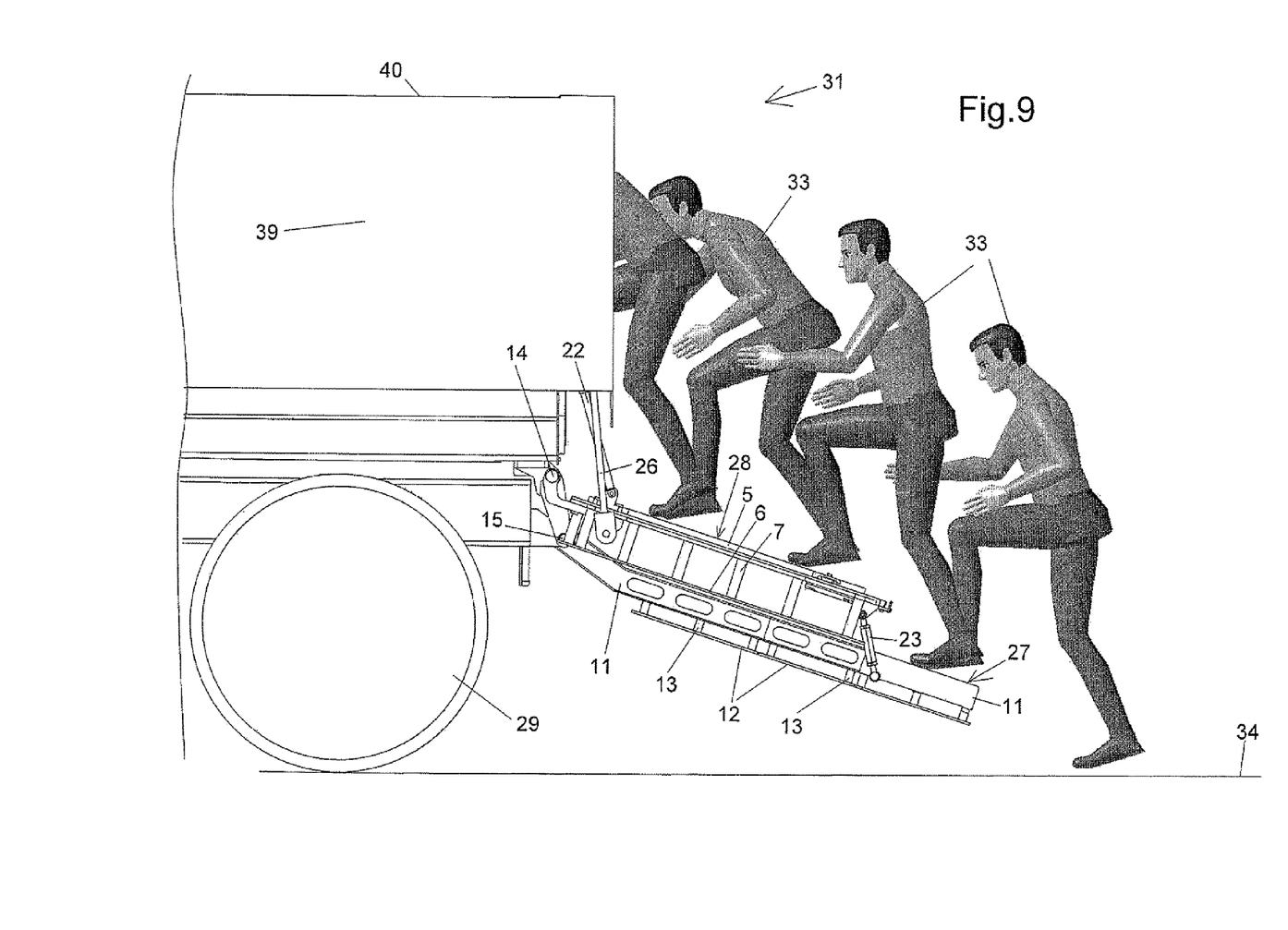
FIG. 9 shows a side view of an access system in the open position affording access to the rear doorway of a vehicle.
Figure 10:
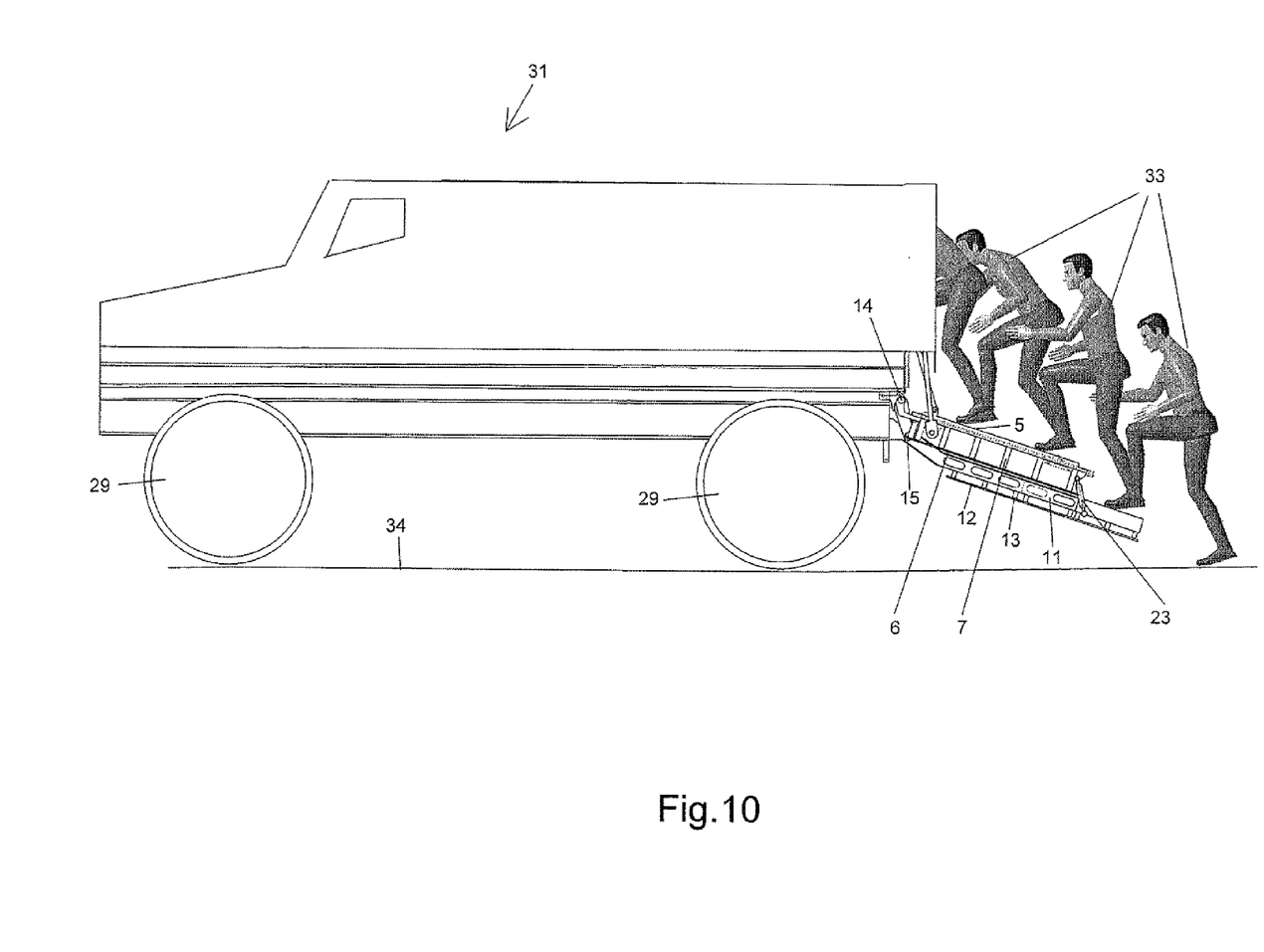
FIG. 10 shows an overall view of the vehicle in FIG. 9.

The vehicle shown in FIGS. 8, 9 and 10 is a raised, armored, military vehicle 31. The vehicle 31 equipped with the access system according to the invention is thus equipped with a raised horizontal floor 30. In the position shown in FIGS. 9 and 10, the end-of-range limit stop caliper 26 is fully extended. The limit stop 26 namely takes the load of the actuator 22, which no longer has to support the door or the step plate for as long as the access system is in the maximal opening position.

An operator 33 is shown in FIG. 9 in several successive positions as he is getting into the vehicle 31. The operator 33 coming from the field 34 stands on the first step 27 of the access system. This first step 27 is formed by the end of the panel 11 of the step plate 10. The free end of the step plate panel 11 here is inclined downwards. Similarly, the door panel 5 is inclined in a position where its free edge points downwards. The operator 33 then puts one foot on the second step 28. The second step is formed by a face of the door panel 5. The operator 33 is then able to put the other foot on the second step so as then to enter the passenger compartment.

FIG. 10 shows an overall view of the vehicle from the side which corresponds to FIG. 9. In the case of an access system installed on a vehicle, the frame is formed by the vehicle chassis, its floor and the cab to the rear of the vehicle.

It is obvious for one skilled in the art that the present invention permits other variants. Consequently, the present embodiments must be considered as illustrative of the invention defined by the enclosed claims.

What is claimed is:

1. A system for accessing a passenger compartment by a doorway made in a chassis frame of the passenger compartment, the access system comprising:
    at least one door hinged to the chassis frame by a first horizontal articulated joint and configured to form an inclined ramp in an open position of the door;
    at least one actuator configured to move the door, linked to the door and the chassis frame;
    at least one drive element;
    a step plate at least partially covering an outside of the door and hinged with respect to the chassis frame by a second articulated joint parallel to the first articulated joint, and the second articulated joint including a hinge pin offset to the first articulated joint, the step plate being linked to the door by the at least one drive element connected to the door by a third articulated joint and to the step plate by a fourth articulated joint; and wherein:
the pins of the first, second, third and fourth articulated joints are parallel to one another and arranged so as to form the four summits of a parallelogram deformable between an open position and a closed position of the door, the passenger compartment is equipped with first external armor plates fixed to the chassis frame by first shock-absorbing elements, the door includes a door panel linked to the first articulated joint, the door panel is equipped with second external armor plates fixed to the door panel by second shock-absorbing elements, and the step plate includes a second panel linked to the second articulated joint, the second panel is equipped with third external armor plates fixed to the second panel by third shock-absorbing elements.

2. An access system according to claim 1, wherein the first articulated joint is linked to a lower edge of the door and a lower edge of the doorway, the second articulated joint being below the first articulated joint and arranged horizontally towards the exterior of the passenger compartment with respect to the first articulated joint.

3. An access system according to claim 1, wherein the step plate is of a size that is greater than that of the door so as to overlap it heightwise when the door is in the closed position.

4. An access system according to claim 1, wherein the third external armor plates overlap the second external armor plates which in turn overlap the first external armor plates.

5. An access system according to claim 1, wherein the first external armor plates leave at least a first unprotected zone on the chassis frame delimiting a housing for the door actuator, the first zone being protected by the second external armor plates.

6. An access system according to claim 1, wherein the second external armor plates leave a second unprotected zone of the door panel, the second zone delimiting at least one housing for the drive means of the step plate and a housing for the second panel, this the second zone being protected by the third external armor plates.

7. An access system according to claim 1, wherein the door is able to move between its closed position and its open position with a maximal angular clearance of between 90° and 135°.

8. An access system according to claim 1, wherein the system comprises at least one limit stop organ to block further movement of the door when in its maximal open position.

9. An access system according to claim 4, wherein the first external armor plates leave at least a first unprotected zone on the chassis frame delimiting a housing for the door actuator, the first zone being protected by the second external armor plates.

10. An access system according to claim 5, wherein the second external armor plates leave a second unprotected zone of the door panel, the second zone delimiting at least one housing for the drive means of the step plate and a housing for the second panel, the second zone being protected by the third external armor plates.

11. An access system according to claim 3, wherein the door is able to move between its closed position and its open position with a maximal angular clearance of between 90° and 135°.

12. An access system according to claim 2, wherein the step plate is of a size that is greater than that of the door so as to overlap it heightwise when the door is in the closed position.

13. A vehicle comprising a passenger compartment equipped with an access system according to the above claim 1.

* * * * *